(12) United States Patent
Shakkarwar

(10) Patent No.: US 10,755,277 B2
(45) Date of Patent: Aug. 25, 2020

(54) SYSTEMS AND METHODS FOR SECURE DEBIT PAYMENT

(71) Applicant: VERIENT INC., San Jose, CA (US)

(72) Inventor: Rajesh G. Shakkarwar, Cupertino, CA (US)

(73) Assignee: VERIENT, INC., San Jose, CA (US)

( * ) Notice: Subject to any disclaimer, the term of this patent is extended or adjusted under 35 U.S.C. 154(b) by 550 days.

(21) Appl. No.: 14/326,357

(22) Filed: Jul. 8, 2014

(65) Prior Publication Data

US 2015/0006406 A1 Jan. 1, 2015

Related U.S. Application Data

(62) Division of application No. 12/118,643, filed on May 9, 2008, now Pat. No. 8,862,509.

(51) Int. Cl.
| | |
|---|---|
| *G06Q 40/00* | (2012.01) |
| *G06Q 20/40* | (2012.01) |
| *G07F 7/10* | (2006.01) |
| *G06Q 20/34* | (2012.01) |
| *G06Q 20/10* | (2012.01) |
| *G06Q 20/26* | (2012.01) |

(52) U.S. Cl.
CPC ....... *G06Q 20/4012* (2013.01); *G06Q 20/102* (2013.01); *G06Q 20/26* (2013.01); *G06Q 20/351* (2013.01); *G06Q 20/35785* (2013.01); *G06Q 20/40* (2013.01); *G06Q 40/00* (2013.01); *G07F 7/1075* (2013.01)

(58) Field of Classification Search
CPC .............................. G06Q 40/00; G06Q 20/26
See application file for complete search history.

(56) References Cited

U.S. PATENT DOCUMENTS

| 7,472,827 B2* | 1/2009 | Fletcher | G06Q 20/12 |
| | | | 235/380 |
| 7,665,657 B2* | 2/2010 | Huh | G06Q 40/00 |
| | | | 705/39 |
| 2003/0033245 A1* | 2/2003 | Kahr | G06Q 40/06 |
| | | | 705/39 |

(Continued)

OTHER PUBLICATIONS

Douglas Akers, Jay Golter, Brian Lamm, and Martha Solt, Overview of Recent Developments in the Credit Card Industry, Nov. 2005, FDIC Banking, web, 1-14 (Year: 2005).*

(Continued)

*Primary Examiner* — I Jung Liu
(74) *Attorney, Agent, or Firm* — Artegis Law Group, LLP

(57) ABSTRACT

A method for generating a personal identification number (PIN) debit child product for use in performing a debit payment transaction with a merchant entity. A payment processing platform receives a user selection of a financial institution made via a merchant payment page and directs the user to authenticate a user identity with the financial institution. The payment processing platform receives a user selection of a core account held with the financial institution, such that the core account provides financial backing for the PIN debit child product. The PIN debit child product is generated that includes a child card number and a virtual PIN associated with the core account. Advantageously, the method provides the ability to make PIN debit transaction on the Internet.

27 Claims, 10 Drawing Sheets

(56) References Cited

U.S. PATENT DOCUMENTS

| 2006/0064320 A1* | 3/2006 | Postrel | G06Q 50/22 |
| | | | 705/2 |
| 2006/0076400 A1* | 4/2006 | Fletcher | G06Q 20/40 |
| | | | 705/44 |
| 2007/0083464 A1 | 4/2007 | Torres et al. | |
| 2008/0086424 A1 | 4/2008 | Jambunathan et al. | |

OTHER PUBLICATIONS

International Search Report for PCT/US2009/043161 dated Nov. 9, 2009.

* cited by examiner

FIG. 3A merchant.com
https://secure.merchant.com/checkout/shippingbilling.asp?straction=
Q▼ Merchant

— 325

WORLD WIDE WEB

| Item | Qty | Total |
|---|---|---|
| Classic Dress Shirt
Unit Price: $89.50
Color: Light Blue
SIZE: 16 - 33
STYLE: 124649
Usually arrives in 5-8 business days.
⊞ Add a Gift Box or Note | 1 | $89.50 |

Summary

Payment Information
Pay with a Gift Card

Only one gift card may be used per order. For details on using your gift card click here.

Gift Card Number: [    ]

Access Number: [  ] A 3-digit number on the back, upper-right corner of your card.

Update my order with Gift Card
[ Update ]

Payment Method

Payment type ⎯ 330
[ Pay from my fin. inst. ▼ ]

Name On Card
[              ]

Select a Financial Institution ⎯ 335
[          ▼ ]                    Exp. Date [    ]

Payment Card Number
[              ]                  PIN [    ]

☐ Set as Default Payment Card

FIG. 6

SYSTEMS AND METHODS FOR SECURE DEBIT PAYMENT

CROSS-REFERENCE TO RELATED APPLICATIONS

This application is a divisional of co-pending U.S. patent application entitled "SYSTEMS AND METHODS FOR SECURE DEBIT PAYMENT", Ser. No. 12/118,643, filed May 9, 2008. The subject matter of this related application is hereby incorporated herein by reference.

BACKGROUND OF THE INVENTION

Field of the Invention

Embodiments of the present invention generally relate to a system for performing an online payment transaction.

Description of the Related Art

As is known, several methods of payment for goods or services exist today, including cash, check, credit card, and debit card. Some of the most popular methods of payment include payment by credit card and by debit card. When credit/debit cards were first introduced, there was no concept of online payments, online banking, or payments via mobile phone. Today, these forms of payment are also very common.

As is known, a credit card system is one where an issuer, usually a financial institution, issues a credit card to a customer. The customer may then pay for goods or services using the credit card. Essentially, the issuer is lending money to the customer to pay for the good or services.

Another common form of payment is using a debit card. Using a debit card is functionally similar to writing a check, as the funds are withdrawn from the bank account of the customer. A transaction using a debit card may be a "signature debit" transaction or a "PIN debit" transaction. When using either form of debit transaction at a physical merchant location, the customer may swipe or insert the debit card into a terminal, or the customer may hand the debit card to the cashier who will do so. A signature debit transaction is authenticated much like a credit card transaction with the customer signing a receipt to verify their identity. A PIN debit transaction, on the other hand, is authenticated when the customer enters a correct personal identification number (PIN) into the terminal.

A signature debit transaction may also be initiated on the Internet. For example, the buyer may type a debit card number into the appropriate payment field on an Internet payment webpage to pay for the goods or services provided by the online merchant. To the online merchant, a signature debit transaction is processed similarly to a credit card transaction.

However, PIN debit transactions are not an available form of payment in online transactions. Customers are wary of entering their PIN number into a payment page of an online merchant for security reasons. The PIN number can be easily stolen by a computer hacker, which may result in the unlawful use of the customer's bank account or even more serious credit problems.

As the foregoing illustrates, there is a need in the art for a way to use a debit card for an online transaction that is more secure than the current approach.

SUMMARY OF THE INVENTION

Embodiments of the present invention provide a method for generating a personal identification number (PIN) debit child product for use in performing a debit payment transaction with a merchant entity. A payment processing platform receives a user selection of a financial institution made via a merchant payment page and directs the user to authenticate a user identity with the financial institution. The payment processing platform receives a user selection of a core account held with the financial institution, such that the core account provides financial backing for the PIN debit child product. The PIN debit child product is generated that includes a child card number and a virtual PIN associated with the core account.

Advantageously, the method provides the ability to make PIN debit transaction on the Internet.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 3A-3B are screen shots illustrating the process of an eCommerce PIN debit transaction, according to one embodiment of the invention.

FIGS. 4-6 are screen shots illustrating the process of an eCommerce PIN debit transaction, according to one embodiment of the invention.

DETAILED DESCRIPTION

In general, the invention relates to a system and a method for performing a PIN debit payment transaction. The invention will be described in relation to a system for facilitating an eCommerce PIN debit payment transaction with an eCommerce merchant. However, it should be understood that the invention may be employed with any system that is configured to facilitate a PIN debit transaction without departing from the principles of the present invention. To better understand the novelty of the system of the present invention and the methods of use thereof, reference is hereafter made to the accompanying drawings.

As is described in greater detail below, a user may generate a "child product" that is linked to a "core account" held with a financial institution. In one embodiment, the core account may be any standard account held with a financial institution, including a checking account, savings account, home equity line of credit, money market account, a healthcare savings account, an educational savings account, or the like. In one embodiment, the child product is generated by a payment processing platform and may be used to make payment transactions. The payment transactions are processed as though the payment transactions were made using the core account. A payment transaction initiated with a merchant using the child product is referred to herein as "child transaction." To the merchant, the child transaction may be processed as though the payment processing platform is the "issuer" of the child product. The payment processing platform determines the core account to which the child product is linked and generates a core account transaction that is processes by a financial institution. To the financial institution, the core account transaction may be processed as though the payment processing platform is the "merchant" from which the transaction was initiated. For example, a PIN debit child product that is linked to a checking core account is processed by the financial institution legacy system in the similar manner as a regular checking account transaction. In further embodiments, control parameters may be added to the PIN debit child product, restricting the usage of the child product, as described in greater detail below.

Figure 1:
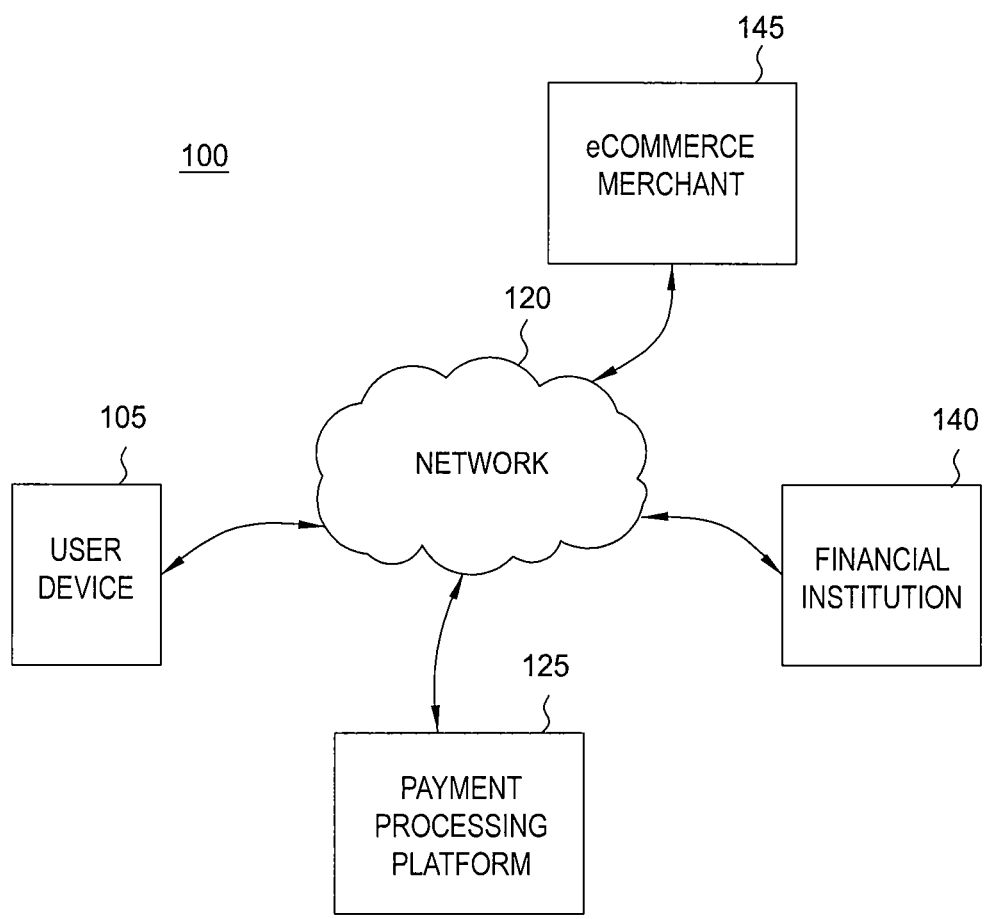
FIG. 1 is a block diagram illustrating components of a system configured to implement one or more aspects of the present invention.

FIG. 1 is a block diagram illustrating components of a system 100 configured to implement one or more aspects of the present invention. As shown, the system 100 includes a user device 105, a network 120, a payment processing platform 125, a financial institution 140, and an eCommerce merchant 145. As will be described herein, a PIN debit child product is generated that allows for a PIN debit transaction on the Internet. Similar to a conventional debit card transaction, the user is able to withdraw funds directly from the user's bank account to pay for goods or services rendered by the eCommerce merchant 145. One unique difference is that a virtual debit card number and virtual PIN are generated that are linked to the core account, and user is able to proceed with the debit transaction as if the transaction was being made using a conventional debit card.

The user device 105 may be any type of individual computing device such as, for example, a desktop computer, a laptop computer, a hand-held mobile device, a personal digital assistant, or the like. Alternatively, the user device 105 may be an ATM terminal for a financial institution, or a terminal used by a customer representative at a financial institution, or a non-computing device, such as a standard telephone, or the like. In one embodiment, the user device 105 is configured to be in communication with the other components in the system 100 via the network 120. The network 120 may be any type of data network, such as a local area network (LAN), a wide area network (WAN), cellular communications network, the Internet, a voice network such as a standard telephone network, or may be a combination of these types of networks.

The system 100 also includes the payment processing platform 125. The payment processing platform 125 interacts with the other components in the system 100 via the network 120 at various steps during the eCommerce PIN debit transaction, as will be described herein. For example, at one step, the payment processing platform 125 may be configured to store a list of financial institutions from which funds are withdrawn during the eCommerce PIN debit transaction. At another step, for example, the payment processing platform 125 may be configured to generate a PIN debit child product that is used to pay the eCommerce merchant 145.

The system 100 also includes the financial institution 140 that may be used to authenticate the user during the eCommerce PIN debit transaction and to provide data regarding the user's various accounts. The system 100 further includes the eCommerce merchant 145 which sells goods or services to the user.

Figure 2:
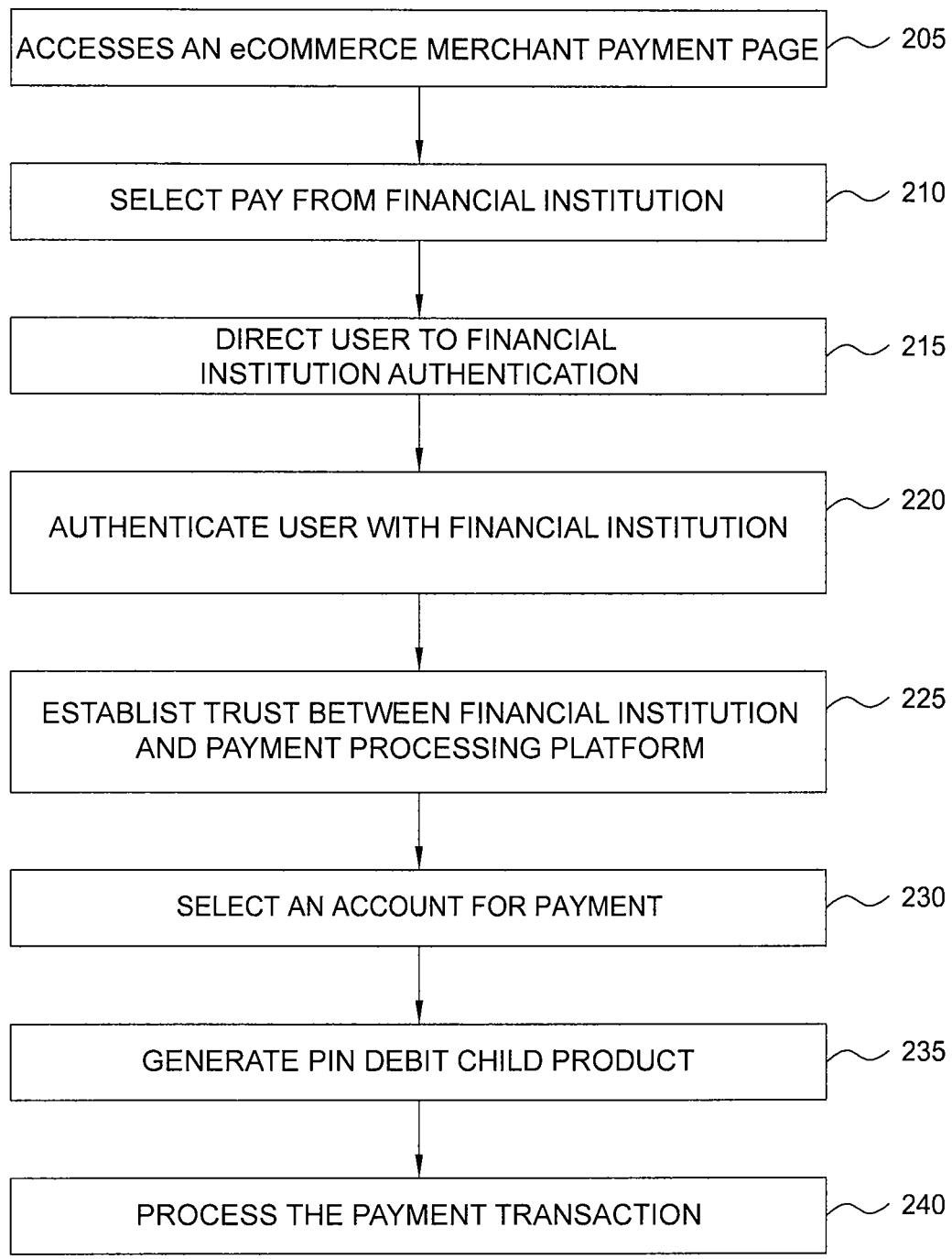
FIG. 2 is a flow diagram of method steps for initiating an eCommerce PIN debit transaction, according to one embodiment of the invention.

FIG. 2 is a flow diagram of method steps for initiating an eCommerce PIN debit transaction, according to one embodiment of the invention. Persons skilled in the art will understand that, even though the method is described in conjunction with the systems of FIG. 1, any system configured to perform the steps of the method 200 illustrated in FIG. 2, in any order, is within the scope of the present invention.

As shown, the method 200 begins at step 205 where a user accesses an eCommerce merchant payment page to input payment information to pay for goods or services. At step 210, the user selects "Pay From My Financial Institution" as the payment method for the goods or services provided by the eCommerce merchant 145. The eCommerce merchant page displays the list of the financial institutions for the user to choose from. In one embodiment, a trigger is sent to the payment processing platform 125, which in return sends the list of all financial institutions offering the eCommerce PIN debit child product. In another embodiment the eCommerce merchant has the list of financial institutions in its system.

Referring now to FIG. 3A, a screen shot illustrates a payment page 325 of the eCommerce merchant 145. The user may select a payment type from a drop-down menu 330. In one embodiment, the user selects a "Pay From My Financial Institution" payment type. The user may then be prompted to select a specific financial institution in a financial institution selection field 335. For example, a list of financial institutions may be displayed in a drop-down menu or the selection of a financial institution may be made by typing the name of the financial institution into the financial institution selection field 335.

In one embodiment, the listing of financial institutions available for selection is provided by the payment processing platform 125. As described above, the payment processing platform 125 may receive a trigger that indicates that the user has selected to pay from a financial institution. The payment processing platform 125 may respond by sending a list of financial institutions to the eCommerce merchant payment page via the network 120. In this embodiment, the payment processing platform 125 stores and maintains the list of financial institutions along with the necessary information relating to each financial institution. Storing the listing of financial institutions at the payment processing platform 125 allows the listing to be updated by the payment processing platform 125 as additional financial institutions are added, without having to modify the payment page of the eCommerce merchant. For example, the payment processing platform 125 may send the eCommerce merchant 145 an updated list of financial institutions each time that a user selects the "Pay From My Financial Institution" payment type.

Referring back to FIG. 2, at step 215, the payment processing platform 125 directs the user to authenticate with the financial institution. Additionally, in one embodiment, the payment processing platform 125 captures information relating to the eCommerce merchant 145 so that a merchant-specific PIN debit child product may be generated by using merchant-specific control parameters, as described in greater detail below.

At step 220, the user is authenticated with the financial institution 140. In one embodiment, the user may be authenticated by entering a username and password into a log-on screen of the financial institution website. In alternative embodiments, a third-party, other than a financial institution, may offer the ability to generate child products. In these embodiments, the user may be authenticated by entering a username and password into a log-on screen of the third-party website. In yet further embodiments, the device with which the user is attempting to authenticate himself is verified by comparing a device fingerprint for the user device against a database of user devices previously registered by the user.

Figure 4:
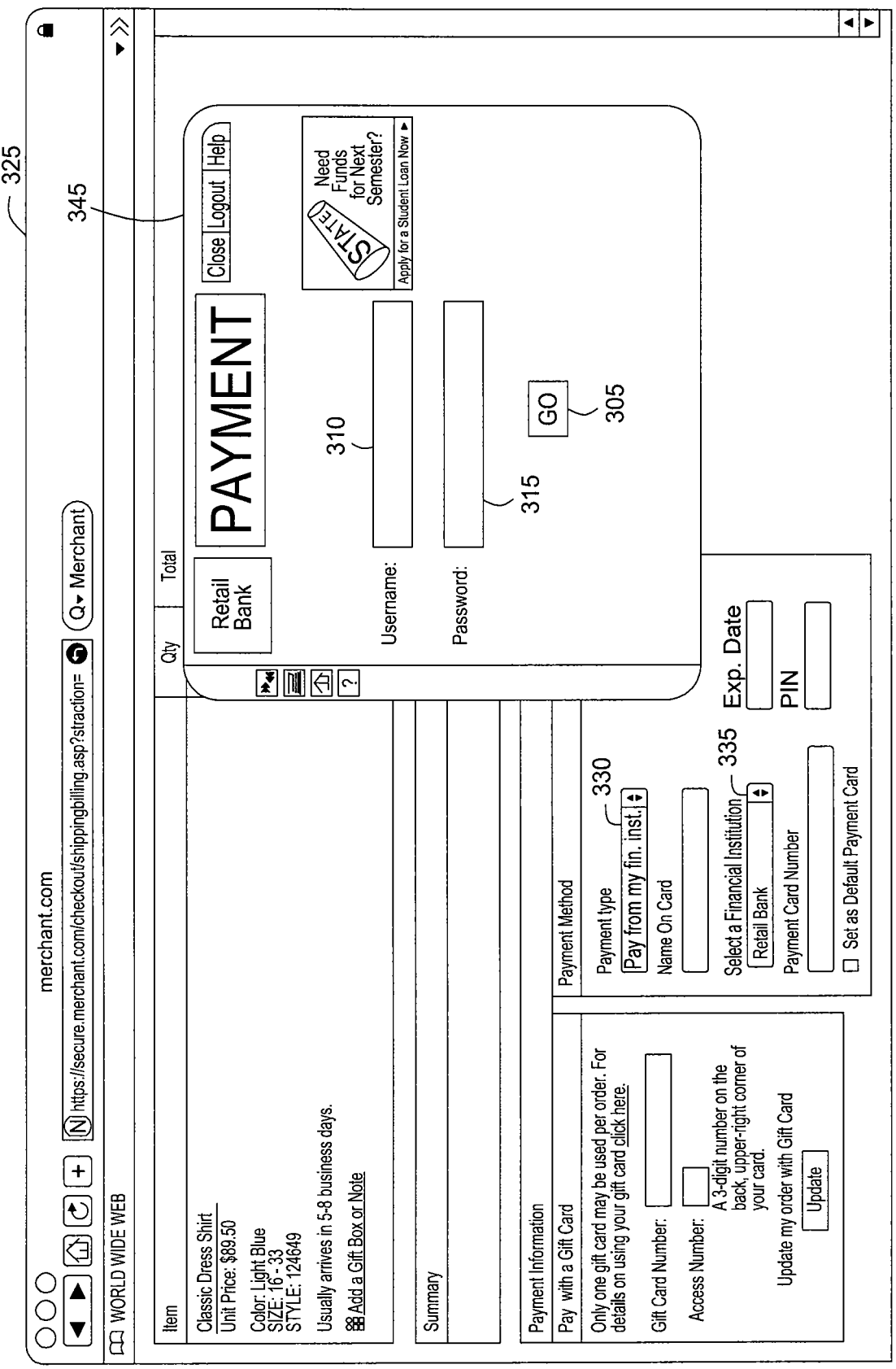

Referring now to FIG. 4, the financial institution 140 generates a second window 345 that prompts the user to enter a username 310 and a password 315. After the information is entered, the user selects a button 305 to continue the payment process. The financial institution 140 then uses the username and password to authenticate the user. In another embodiment, a third party, other than a financial institution, that may be responsible for authentication, generates a second window 345. As is known, the authenticating system verifies the username and password with previously stored personal information about the user and subsequently authenticates the user when the identity information matches.

As an added layer of security, the payment processing platform 125 may conduct additional authentication of the user by extracting unique information from the user machine 105 and verifying the unique information with a profile previously stored in the payment processing platform 125. After the user has been authenticated with the financial institution 140 or third party, the payment processing platform 125 may prompt the security agent installed on the user device 105 for the device profile of the user device 105. The security agent transmits the device profile to the payment processing platform 125. The received device profile is compared to data stored in a device fingerprint authentication server that may include a listing of approved/authenticated user devices associated with each user. In one embodiment, each time that a user attempts to authenticate with a different user device 105, a confirmation code is sent to an email address for the user that the user enters before the user device is authenticated. In alternative embodiments, the confirmation code may be sent to the user via a Short Message Service (SMS), a text message, or via any other electronic means. Once a particular user device 105 has been confirmed, the device profile of the user device 105 is stored in the database of the device fingerprint authentication server. The next time the user attempts to authenticate using that particular user device 105, the device profile of the user device 105 is recognized by the device fingerprint authentication server and the user is authenticated. Once the user is properly authenticated, the method 200 proceeds to step 225.

At step 225, a trust is established between the financial institution 140 and the payment processing platform 125. In another embodiment, at step 225, a trust is established between a third party other than a financial institution that may be responsible for authentication and the payment processing platform 125. Step 225 is described in greater detail in FIG. 7.

Figure 7:
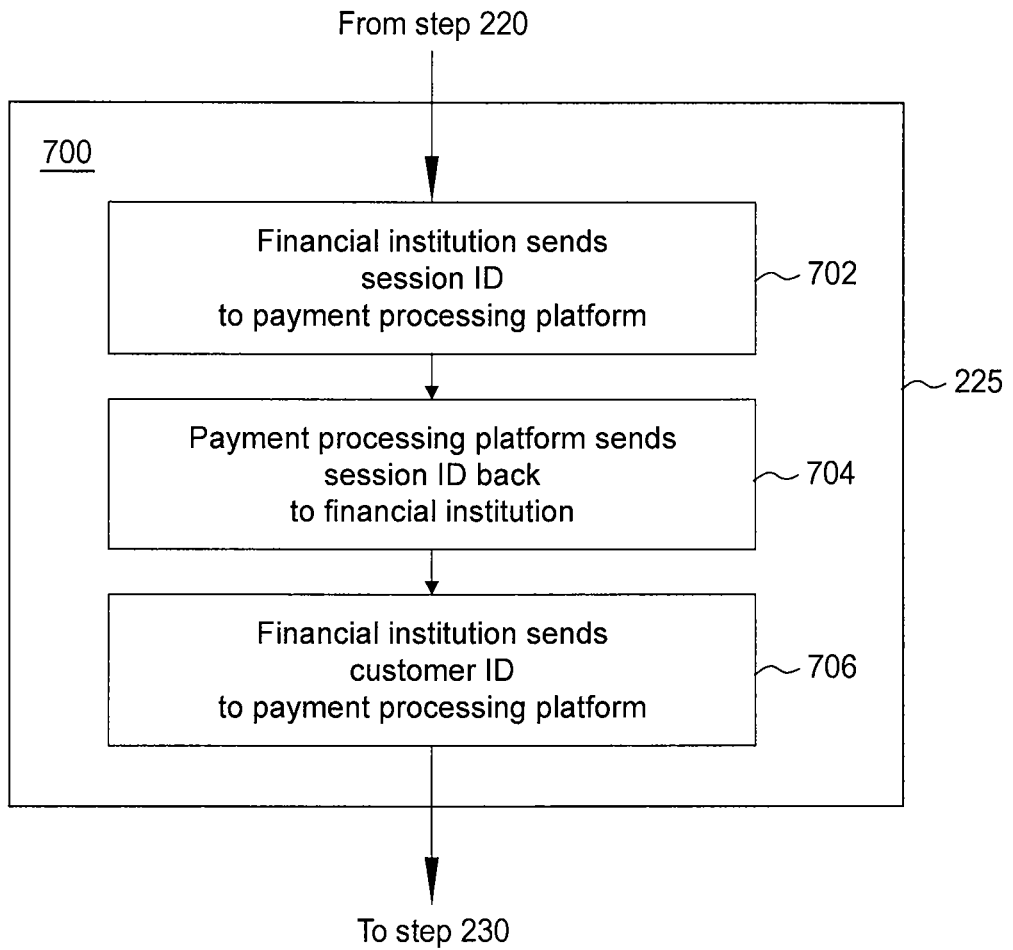
FIG. 7 is flow diagram of method steps for establishing trust between a financial institution and a payment processing platform, according to embodiments of the invention.

FIG. 7 is flow diagram of method steps for establishing trust between a financial institution 140 and a payment processing platform 125, according to embodiments of the invention. Persons skilled in the art will understand that, even though the method is described in conjunction with the systems of FIG. 1, any system configured to perform the steps of the method 700 illustrated in FIG. 7, in any order, is within the scope of the present invention.

As shown, the method 700 begins at step 702 where the financial institution 140 sends a session identifier (session ID) to the payment processing platform 125 to begin the trust establishment process. In one embodiment, the session ID is passed from the financial institution 140 to the payment processing platform 125 through via second window 345. Next, at step 704, the payment processing platform 125 sends the session ID back to the financial institution 140 through a back door to verify that the financial institution 140 had indeed sent that session ID, rather than a hacker, for instance. It should be noted that the exchange of the session ID is not the only means of establishing trust between the systems 125, 140; rather, trust may be established by any means known in the art without departing from the principles of the present invention. Then, at step 706, the financial institution 140 sends a customer identifier (customer ID) to the payment processing platform 125. In one embodiment, within the servers of the payment processing platform 125, the customer ID may be used to translate from a child product card number to a "real" account number, as described in greater detail below.

Figure 5:
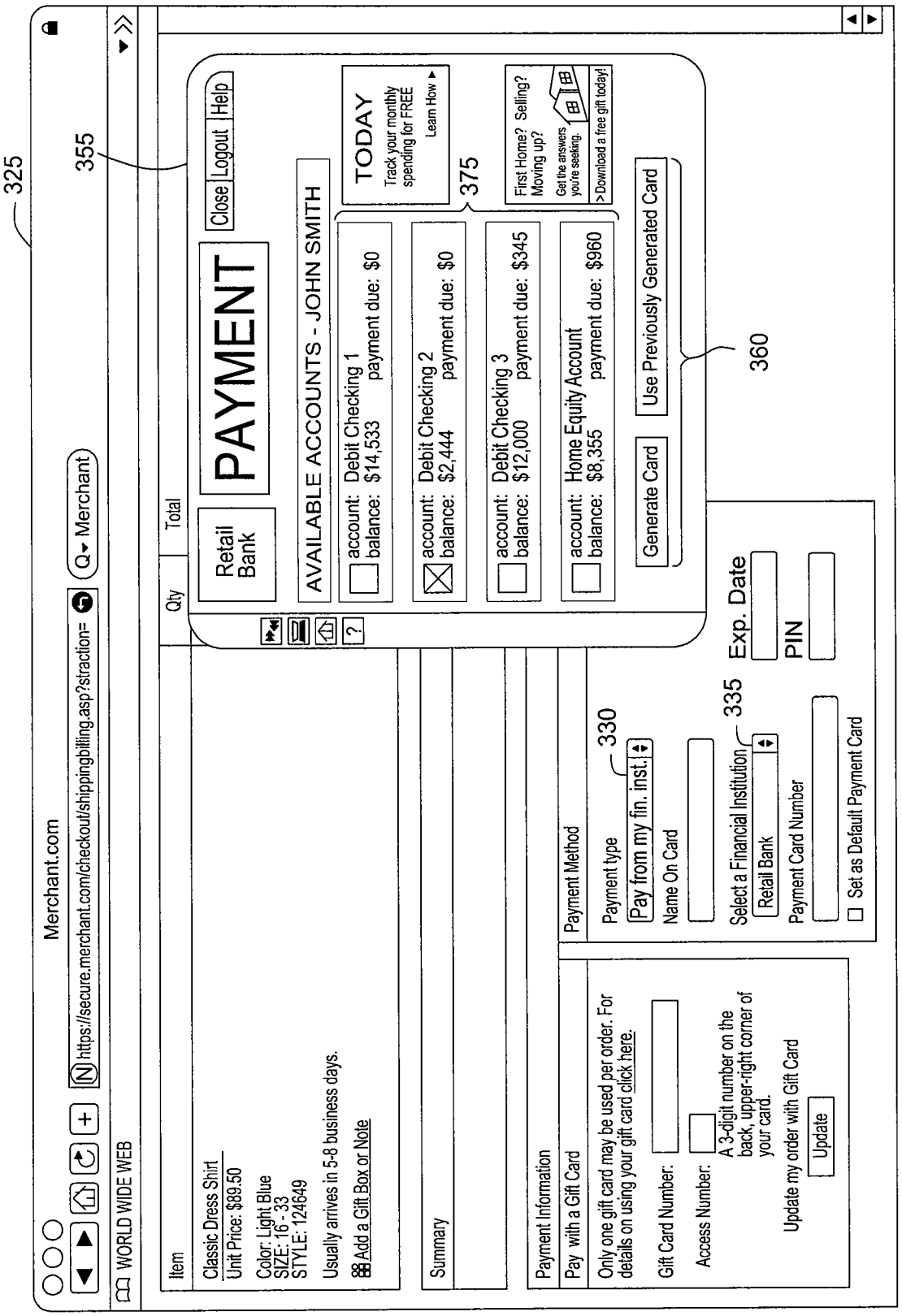

After step 706, the transaction process proceeds to step 230. Referring back to FIG. 2, at step 230, the user selects an account from which to pay for the goods or services provided by the eCommerce merchant 145. As shown in FIG. 5, the payment processing platform 125 displays an account list 375 via a second window 355. In another embodiment the financial institution 140 may display the account list 375 in a second window 355. The user may then select one or more accounts from the account list 375 with which to pay. In one embodiment, the accounts listed by the payment processing platform 125 may be called "core accounts," and may be any standard account held with a financial institution, including a checking account, a savings account, a money market account, or the like.

Figure 3B:
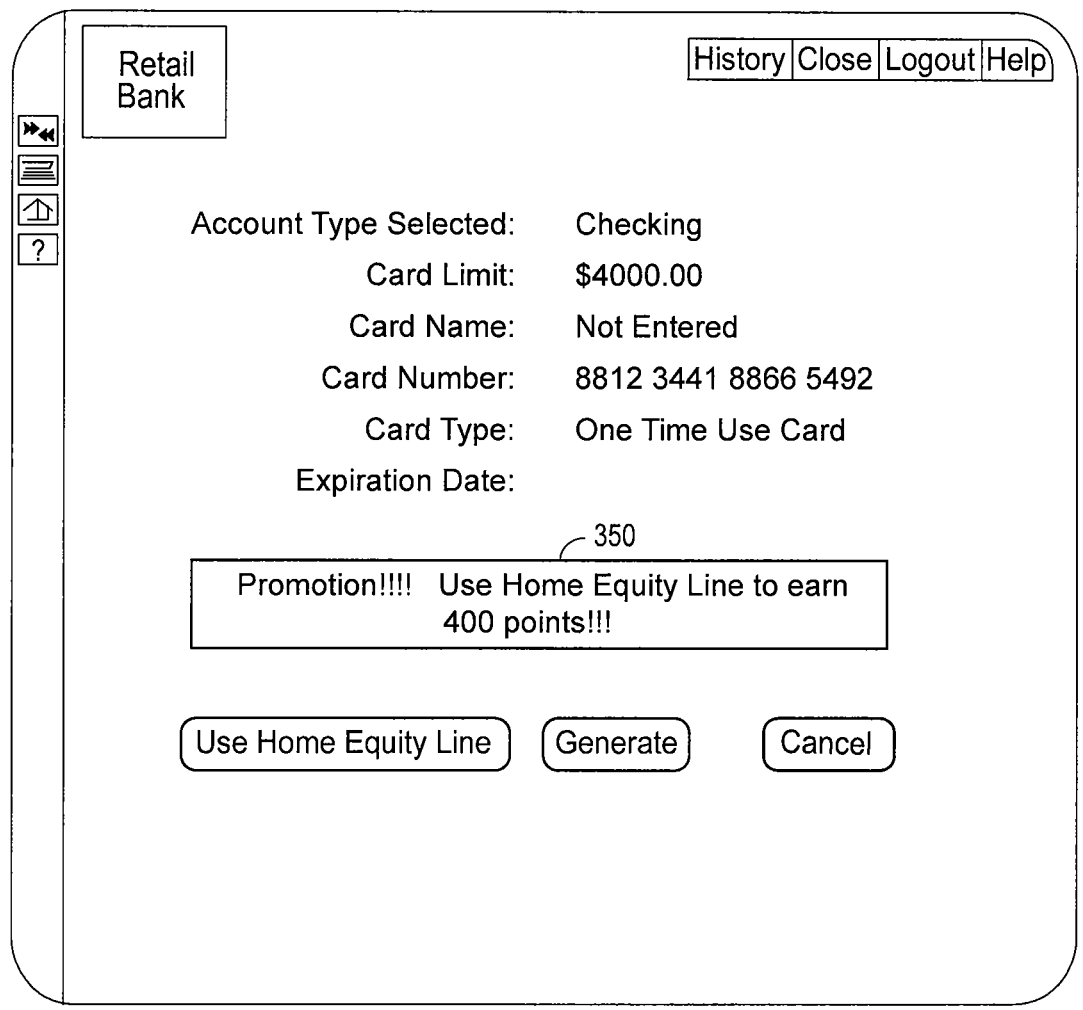

Referring now to FIG. 3B, after the user has selected a core account from which to generate the PIN debit child product, the payment processing platform 125 may offer the user a promotion 350 if the user chooses a different core account. For example, as shown in FIG. 3B, the user may be offered a point earning opportunity if the user chooses to use a home equity line of credit as the core account to which the PIN debit child product is linked.

Referring back to FIG. 2, at step 235, a PIN debit child product is generated by the payment processing platform 125. In one embodiment, the child product is generated having a 16-digit card number, a PIN value, an expiration date, and a name on card. As is known, a card number includes a Bank Identification Number or BIN number. The BIN number is generally a one- to six-digit number that identifies the financial institution that issued the debit card. In one embodiment of the invention, the child product generated at step 235 includes a BIN number that identifies that the child product was issued by the payment processing platform 125. In alternative embodiments, the generated child card may include a BIN number within a range that identifies that the child product is associated with a particular financial institution, but is nevertheless a child product A virtual debit card number and a virtual PIN may be generated that are linked to the user's account held at the financial institution. The user is able to initiate the eCommerce payment transaction as if the transaction was being made using a normal debit card. In this way, because the user has already been authenticated with the financial institution through the financial institution's authentication server, the virtual PIN serves the same purpose as a real PIN from the merchant's perspective. A core account transaction, including a "real" account number of the core account held with the financial institution 140, may then be generated by the payment processing platform 125 and sent to the financial institution 140 that issued the core account. The processing system at the financial institution 140 that issued the core account processes the core account transaction in normal fashion and approves or denies the transaction based on a normal set of processing rules. In one embodiment, the core account transaction is processed as a PIN debit transaction at the financial institution 140. In another embodiment, the core account transaction is processed as a PIN-less PIN debit transaction at the financial institution 140.

The PIN debit child product allows for PIN debit transaction on the Internet. Similar to a conventional debit card transaction, the user is able to withdraw funds directly from a core account to pay for the goods or services rendered by the eCommerce merchant 145. One unique difference is that a virtual debit card number is generated that is linked to the core account, and user is able to proceed with the debit transaction as if the transaction was being made using a conventional debit card. Another unique difference is that the user does not have to input a real PIN number since the payment processing platform has provided a virtual PIN to verify that the financial institution has already authenticated the user. In this way, because the user has been authenticated with the financial institution, a virtual PIN debit transaction is contemplated.

Figure 6:
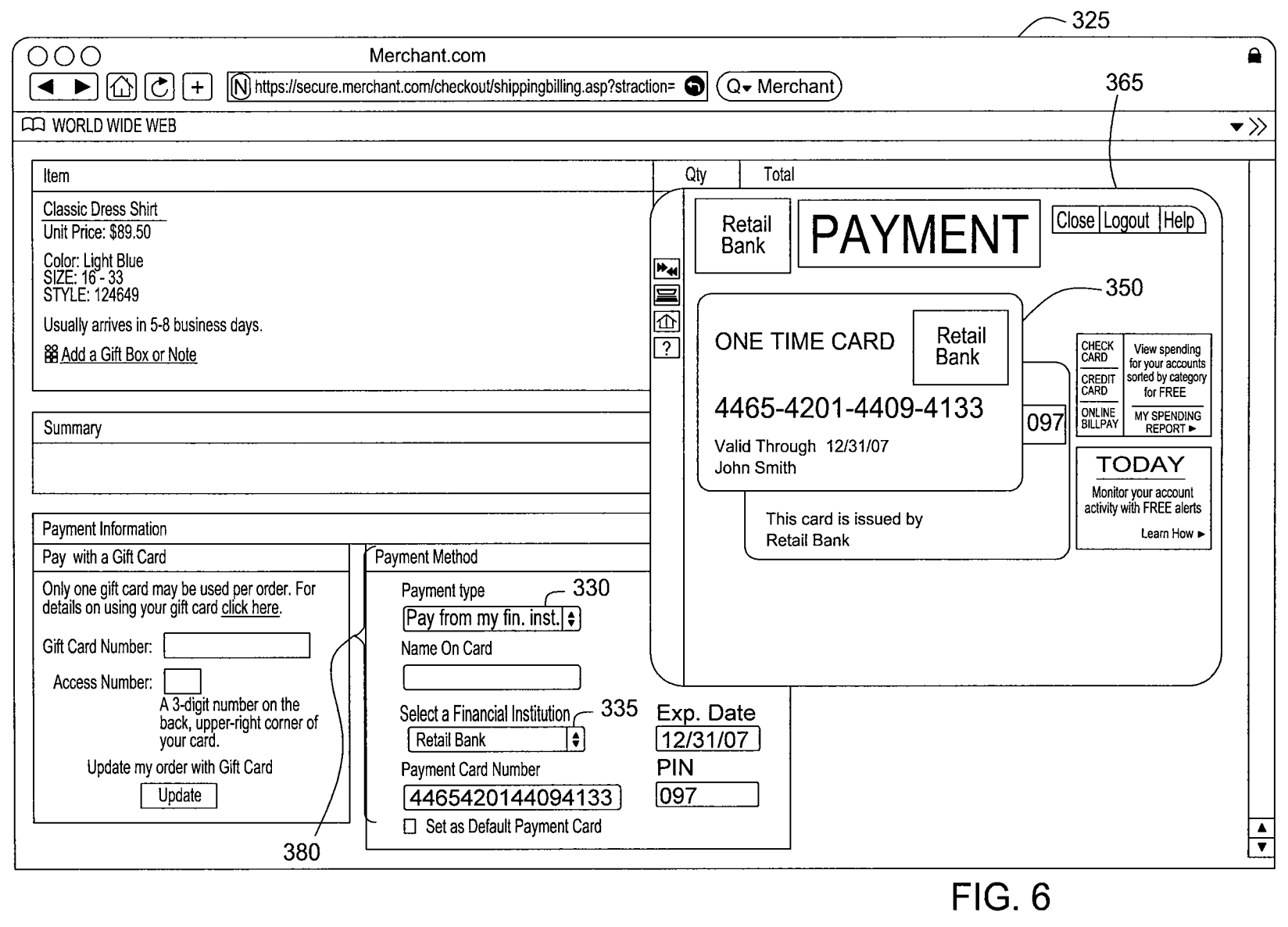

Referring now to FIG. 6, a second window 365 displays the PIN debit child product 350 generated by the payment processing platform 125. In one embodiment, the PIN debit child product 350 is generated having a 16-digit card number, a PIN, an expiration date, and a name on card. In one embodiment of the invention, the PIN debit child product generated at step 235 includes a BIN number that identifies that the PIN debit child product 350 was issued by the payment processing platform 125. In another embodiment of the invention, the PIN debit child product generated at step 235 includes a BIN number that identifies that the PIN debit child product 350 was issued by the financial institution 140.

The PIN debit child product 350 may be configured with specific control parameters. In one embodiment, control parameters include a series of restrictions on transactions made with PIN debit child product. For example, the control parameters may include, but are not limited to, one time use card, reusable card, card spending limit, per transaction spending limit, limit on number of transactions in a given period, name on card, activation date, expiration date, country of use, merchant name, or merchant category, time of day, day of week, date of month, merchant channel (internet, point-of-sale), reset frequency for resetable cards, and the like. When PIN debit child product is attempted to be used in a payment transaction, the transaction details may be checked against the control parameters stored for the PIN debit child product. For example, the PIN debit child product may be a one time use child product that is deactivated after being used once in a payment transaction.

When a child product is attempted to be used in an eCommerce payment transaction, the transaction details may be checked against the control parameters stored for the child product. In one embodiment, if at least one of the control parameters is not satisfied, then the transaction is rejected. If each of the control parameters match those stored for the child product, the transaction is processed as described in greater detail below in FIGS. 15 and 16. In alternative embodiments, if a minimum number of control parameters are satisfied, then the transaction is approved. For example, a child product may include five control parameters and a transaction is approved if four out of five control parameters are satisfied. In still further embodiments, control parameters may be assigned "weights" such that a transaction is approved if the sum of the weights assigned to the satisfied control parameters exceeds a minimum value. For example, a per use limit control parameter may be assigned a weight of five, a merchant category control parameter may be assigned a weight of four, a merchant name parameter may be assigned a weight of three, and all other control parameters may be assigned a weight of two. In this example, a transaction may be approved if the sum of the satisfied control parameters exceeds ten. As will be understood by those having ordinary skill in the art, other techniques for comparing the transaction details against the control parameters stored for the child product to determine a match may be available.

In one embodiment, the control parameters from the generated PIN debit child product may automatically include a merchant restriction. For example, the control parameter may limit the use of the generated PIN debit child product to the specific merchant from which the user is attempting to make a purchase. Similarly, a control parameter may be automatically created that limits the generated PIN debit child card to use within a time interval, e.g., the next hour. For example, if a transaction is attempted with the generated card number outside of the one-hour time limit, then the transaction is denied. As one having ordinary skill in the art will appreciate, other automatically generated control parameters may be created for the generated PIN debit child product.

As also shown in FIG. 6, in one embodiment, the PIN debit child product information may be automatically filled into the payment fields 380. Enabling this "auto-fill" option allows for the automatic transfer of the name, card number, expiration date, and PIN value of the generated PIN debit child product to the payment fields 380 of the merchant's payment page 325. In alternative embodiments, the user may manually input the PIN debit child product information into the payment page 325. In another embodiment, the user may drag-and-drop the payment information in the appropriate payment fields 380 on the payment page 325. In yet another embodiment, the security agent installed on the user machine 105 may transfer the payment information and populate the appropriate payment fields 380 on the payment page 325. In a still further embodiment, a java script code that is running within the second window 365 may transfer the payment information and populate the appropriate payment fields 380 on the payment page 325. In yet another embodiment, the user may select an "Auto Fill" button on the second window 365 to have the appropriate payment fields 380 on the payment page 325 populated.

Referring back to FIG. 2, at step 240, the payment transaction is processed. The details of step 240 are illustrated in FIGS. 8 and 9.

Figure 8:
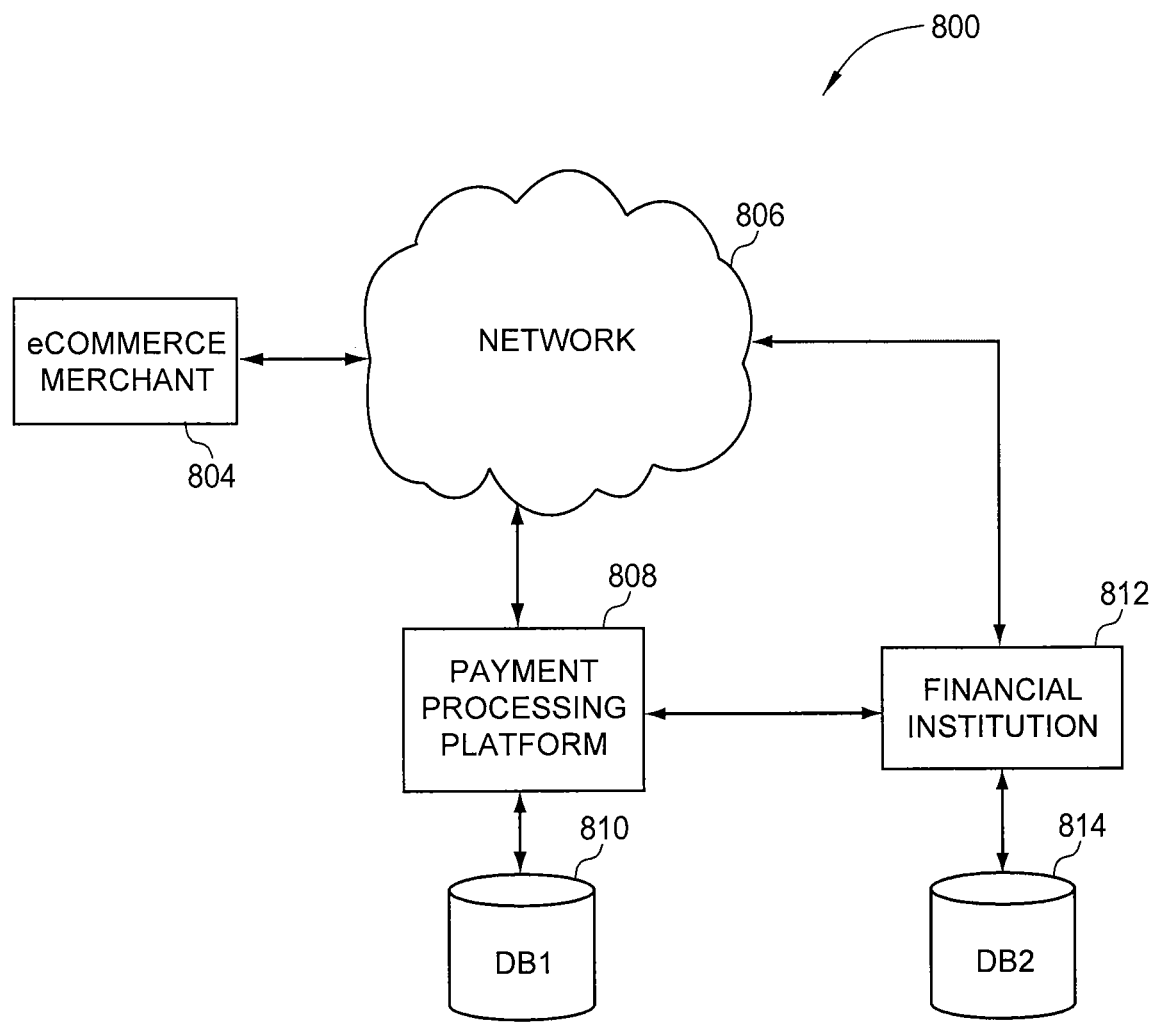
FIG. 8 is a block diagram illustrating components of a system configured to process an eCommerce PIN debit transaction, according to embodiments of the invention.
Figure 9:
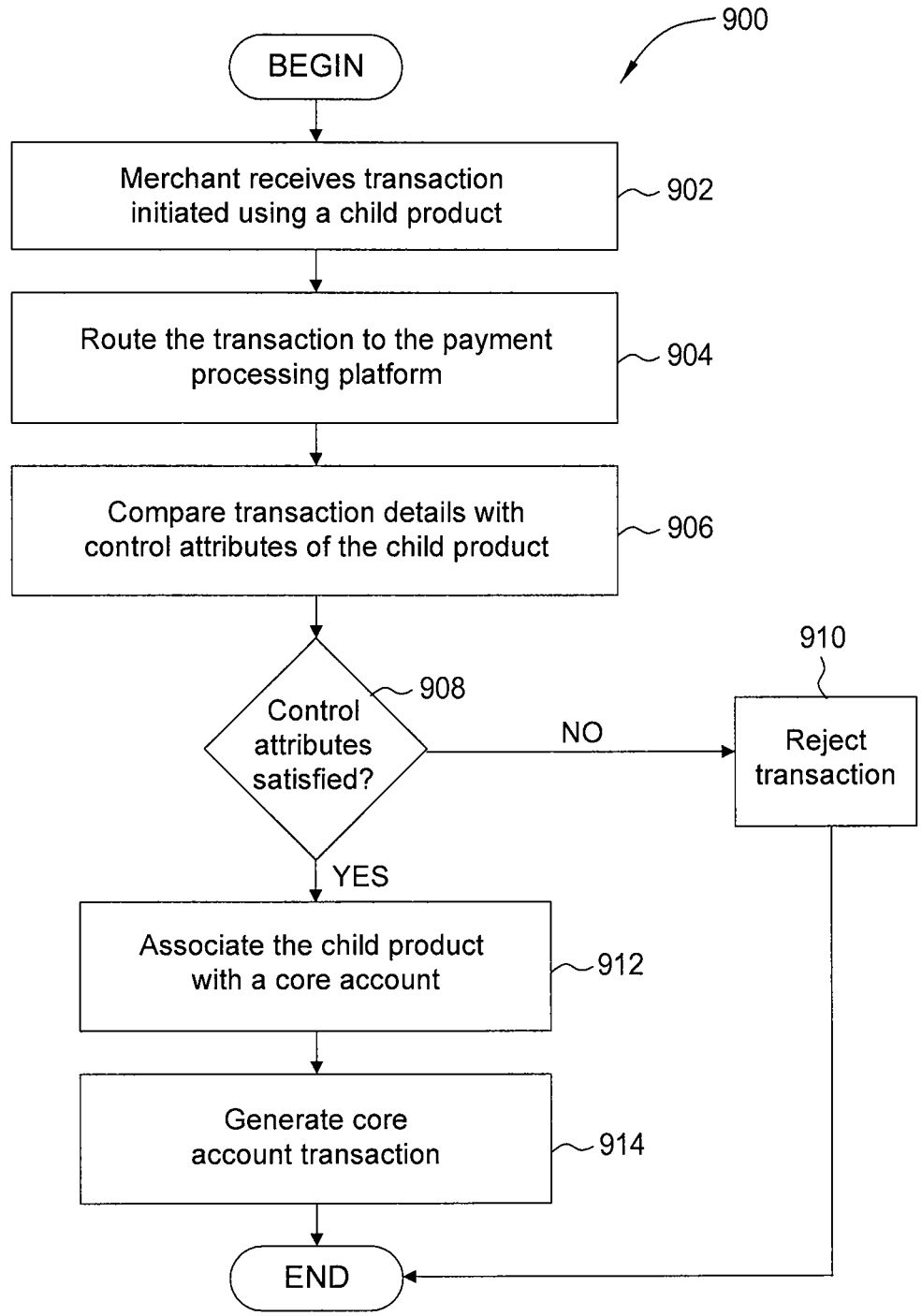
FIG. 9 is a flow diagram of method steps for processing an eCommerce PIN debit transaction, according to one embodiment of the invention.

FIG. 8 is a block diagram illustrating components of a system 800 configured to process an eCommerce PIN debit transaction, according to embodiments of the invention. As shown, the system 800 includes an eCommerce merchant 804, a network 806, a payment processing platform 808, a first database 810, a financial institution 812, and a second database 814.

In one embodiment, a transaction initiated with a PIN debit child product is known as an "eCommerce PIN debit transaction." As described above, the PIN debit child product may be delivered in the form of a virtual card through the user's web browser. Alternatively, a child product may be delivered virtually on a user's mobile device.

In one embodiment, network 806 is an electronic funds transfer (EFT) network or a private network. Additionally, the PIN debit child product may be a special card in which case the eCommerce PIN debit transaction information is sent to the appropriate private network.

In one embodiment, when a eCommerce PIN debit transaction is received by the network 806 and identified as having a BIN number range associated with the payment processing platform 808 that issued the PIN debit child product, then the eCommerce PIN debit transaction is routed to the payment processing platform 808. In another embodiment, when a child transaction is received by the network 806 and identified as having a special BIN number range associated with a financial institution of the core account, then the child transaction is routed to the payment processing platform 808.

When a eCommerce PIN debit transaction is received by the payment processing platform 808, the payment processing platform 808 may then compare the eCommerce PIN debit transaction details with control parameters stored for that particular PIN debit child product in the first database 810. As described above, the comparison may require that each control parameter stored for the PIN debit child product is satisfied, that a minimum number of control parameters are satisfied, or that a sum of the weights assigned to control parameters that are satisfied exceeds a minimum value. In one embodiment, if at least one of the control parameters is not satisfied, then the payment processing platform may return a decline response to the network 806 and the eCommerce PIN debit transaction is denied. If each of the control parameters is satisfied, then the card number of the PIN debit child product is linked to the "real" account number of the core account to which the PIN debit child product is linked. In one embodiment, the second database 814 contains the mapping from child product card numbers to core account numbers, and may be located on the systems of the financial institution 812. In alternative embodiments, the second database 814 may reside on systems operated by the payment processing platform 808. Once the core account number is determined, a core account transaction is generated and is transmitted to the network 806 for normal routing and processing as a core account transaction. In one embodiment, the core account transaction includes the real PIN number and real core account number of the core account. In alternative embodiments, the core account transaction can be a PIN-less transaction because the user has previously authenticated with the financial institution 812. The core account transaction is sent to the financial institution 812 that issued the core account. The processing system at the financial institution 812 that issued the core account processes the core account transaction in normal fashion and approves or denies the transaction based on a normal set of processing rules.

In one embodiment, the payment processing platform receives one or more attributes defining the debit payment transaction, such that the debit payment transaction is initiated via a merchant payment page and the virtual PIN is used as a standard PIN. The payment processing platform compares the one or more attributes to the at least one control parameter and determines a child card number associated with the debit payment transaction. In one embodiment the payment processing platform identifies a core account number and a core account PIN number associated with the core account based on the child card number and virtual PIN. In another embodiment the payment processing platform identifies a core account number associated with the core account based on the child card number and virtual PIN.

FIG. 9 is a flow diagram of method steps for processing an eCommerce PIN debit transaction, according to one embodiment of the invention. Persons skilled in the art will understand that, even though the method 900 is described in conjunction with the systems of FIGS. 1 and 8, any system configured to perform the steps of the method 900 illustrated in FIG. 9, in any order, is within the scope of the present invention.

As shown, the method 900 begins at step 902 where a merchant receives a child transaction initiated using a PIN debit child product. In one embodiment, the merchant is an eCommerce merchant and receives a child product card number that is input into a payment webpage of the eCommerce merchant website. In one embodiment, the child transaction is an eCommerce PIN debit transaction. The child transaction is then passed to the payment processing platform 125.

At step 904, the child transaction is routed to the payment processing platform that generated the child product. As described above, a child product includes a BIN number range that identifies it being a child product. In one embodiment, the child transaction is passed directly to the payment processing platform, bypassing the network. In alternative embodiments, the child transaction is passed to the payment processing platform through a network. In alternative embodiments, the child transaction is processed through multiple networks before ultimately being routed to the payment processing platform.

At step 906, the payment processing platform compares the child transaction details with control parameters of the child product. As described above, each child product is associated with a series of control parameters that are stored in a first database, referenced by child product. When the child transaction is received by the payment processing platform, the child product card number may be used as a reference pointer to determine the associated control parameters stored in the first database.

At step 908, if the control parameters of the child transaction do not match the control parameters stored in the first database, then the child transaction is rejected, a denial is returned at step 910, and the method 900 terminates. In one embodiment, if the child transaction was routed from the merchant to the payment processing platform bypassing the network, then the denial is returned directly to the merchant. In alternative embodiments, if the child transaction was routed through a network to the payment processing platform, then the denial is returned to the network and routed to the merchant.

As described above, the determination of whether the control parameters match at step 908 may require that each control parameter stored for the child product is satisfied, that a minimum number of control parameters are satisfied, or that a sum of the weights assigned to control parameters that are satisfied exceeds a minimum value. If at step 908 the control parameters match, then the method 900 proceeds to step 912.

At step 912, the child product is associated with a core account. As described above, a second database stores a mapping of the child product to the core account to which the child product is linked. In one embodiment, the second database resides on the financial institution system. In alternative embodiments, the second database resides within the payment processing platform system.

At step 914, a core account transaction is generated with the core account number and other child transaction details. In one embodiment, the core account transaction is transmitted to the network for normal processing. For example, the financial institution that receives the core account transaction may view the core account transaction having the payment processing platform as being the "merchant" from which the transaction was initiated. In one embodiment the core account transaction includes the real card number and the core account PIN number and is processed as a normal debit transaction. In another embodiment the core account transaction includes the real card number and no core account PIN and because the user has authenticated with the financial institution, a PIN-less PIN debit transaction is processed.

In alternative embodiments, the core account transaction is transmitted directly to the financial institution from the payment processing platform, bypassing the network. In alternative embodiments, when the core account transaction is received at the financial institution, the financial institution sees the core account transaction as initiating from the payment processing platform. Thus, the financial institution transfers funds to the payment processing platform, which in turn transfers the funds to the original merchant. In alternative embodiments, the financial institution that receives the core account transaction can determine the original merchant is the payee, and the funds are transferred to the merchant, bypassing the payment processing platform.

One advantage of the systems and methods disclosed herein is that when processing a child transaction, the financial institution needs to modify its legacy payment processing infrastructure minimally. Financial institutions would prefer using a child product system over prior art payment processing systems because the child products could be financial institution-branded and the payment processing platform is transparent to the user. Additionally, because PIN debit child products have a similar format as conventional debit cards, eCommerce merchants need minimal modifications to their systems.

Advantageously, the systems and methods disclosed herein allow for PIN debit transaction on the Internet without requiring the user to input a real PIN number. Thus, users do not need to worry that their PIN number is vulnerable to theft.

While the forgoing is directed to embodiments of the present invention, other and further embodiments of the invention may be devised without departing from the basic scope thereof. For example, aspects of the present invention may be implemented in hardware or software or in a combination of hardware and software. In addition, one embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

The invention claimed is:

1. A computer-implemented method implemented by a payment processing platform, the method comprising:

receiving, via a remote software application, a user selection of a financial institution that is separate and distinct from the payment processing platform;
receiving a user selection of a core account held with the financial institution, wherein the core account provides financial backing for a personal identification number (PIN) debit child product;
generating the PIN debit child product, wherein:
the PIN debit child product is associated with the core account, and
the PIN debit child product includes a virtual PIN, a child debit card number, and a bank identification number (BIN),
the BIN identifies the payment processing platform as an issuer of the PIN debit child product, and
the PIN debit child product includes a set of control parameters specifying a restriction on a transaction attribute;
receiving, via a network, (i) the child debit card number, and (ii) a first set of transaction attributes that define an online payment transaction;
comparing the first set of transaction attributes to the set of control parameters to determine whether the online payment transaction is valid;
in response to determining that the online payment transaction is valid, translating the child debit card number into a debit card number associated with the core account by using a customer ID; and
transmitting, from the payment processing platform via the network to a financial institution server, the debit card number and the first set of transaction attributes,
wherein the financial institution server approves the online payment transaction by processing the debit card number and the first set of transaction attributes.

2. The method of claim 1, further comprising directing a user to authenticate a user identity associated with the financial institution.

3. The method of claim 2, wherein the user identity is authenticated by extracting device data from a user machine to allow the user machine to be identified.

4. The method of claim 1, wherein the online payment transaction is received from a merchant entity that is initiated using the PIN debit child product.

5. The method of claim 4, further comprising generating a second payment transaction for transmission to the financial institution, wherein the second payment transaction includes the debit card number and the first set of transaction attributes.

6. The method of claim 1, further comprising establishing a trust between the payment processing platform and the financial institution.

7. The method of claim 6, wherein establishing the trust comprises:
receiving a session identifier from the financial institution;
returning the session identifier to the financial institution; and
receiving a customer identifier from the financial institution.

8. The method of claim 1, wherein a first control parameter included in the set of control parameters comprises at least one of: a limit on an amount for a transaction associated with the PIN debit child product, a limit on a number of transactions made using the PIN debit child product during a period of time, an activation date, an expiration date, a country of use parameter, a merchant parameter, a merchant category parameter, a time of day parameter, a day of week parameter, a date of month parameter, a reset frequency parameter, or a channel parameter.

9. The method of claim 1, wherein the core account comprises a checking account, a savings account, a healthcare savings account, an educational savings account, or a home equity account.

10. The method of claim 1, further comprising automatically filling payment fields of a merchant payment page with tithe child debit card number, and (ii) the virtual PIN.

11. The method of claim 1, further comprising, in response to receiving the user selection of the core account, offering a promotion.

12. The method of claim 1, wherein the PIN debit child product comprises a one-time use product that is deactivated after being used once in the online payment transaction.

13. The method of claim 1, wherein the PIN debit child product comprises a reusable product that may be used for multiple payment transactions.

14. One or more non-transitory computer-readable media including instructions that, when executed by one or more processors included in a payment processing platform, cause the one or more processors to perform the steps of:
    receiving, via a remote software application, a user selection of a financial institution that is separate and distinct from the payment processing platform;
    receiving a user selection of a core account held with the financial institution, wherein the core account provides financial backing for a personal identification number (PIN) debit child product; and
    generating the PIN debit child product, wherein:
        the PIN debit child product is associated with the core account,
        the PIN debit child product includes a virtual PIN, a child debit card number, and a bank identification number (BIN), and
        the BIN identifies the payment processing platform as an issuer of the PIN debit child product, and
        the PIN debit child product includes a set of control parameters, each control parameter specifying a restriction on a transaction attribute;
    receiving, via a network, (i) the child debit card number, and (ii) a first set of transaction attributes that define an online payment transaction;
    comparing the first set of transaction attributes to the set of control parameters to determine whether the online payment transaction is valid;
    in response to determining that the online payment transaction is valid, translating the child debit card number into a debit card number associated with the core account by using a customer ID; and
    transmitting, from the payment processing platform via the network to a financial institution server, the debit card number and the first set of transaction attributes,
    wherein the financial institution server approves the online payment transaction by processing the debit card number and the first set of transaction attributes.

15. The one or more non-transitory computer-readable media of claim 14, further comprising directing a user to authenticate a user identity associated with the financial institution.

16. The one or more non-transitory computer-readable media of claim 15, wherein the user identity is authenticated by extracting device data from a user machine to allow the user machine to be identified.

17. The one or more non-transitory computer-readable media of claim 14, wherein the online payment transaction is received from a merchant entity that is initiated using the PIN debit child product.

18. The one or more non-transitory computer-readable media of claim 17, further comprising generating a second payment transaction for transmission to the financial institution, wherein the second payment transaction includes the debit card number and the first set of transaction attributes.

19. The one or more non-transitory computer-readable media of claim 14, further comprising establishing a trust between the payment processing platform and the financial institution.

20. The one or more non-transitory computer-readable media of claim 19, wherein establishing the trust comprises:
    receiving a session identifier from the financial institution;
    returning the session identifier to the financial institution; and
    receiving a customer identifier from the financial institution.

21. The one or more non-transitory computer-readable media of claim 14, wherein a first control parameter included in the set of control parameters comprises at least one of: a limit on an amount for a transaction associated with the PIN debit child product, a limit on a number of transactions made using the PIN debit child product during a period of time, an activation date, an expiration date, a country of use parameter, a merchant parameter, a merchant category parameter, a time of day parameter, a day of week parameter, a date of month parameter, a reset frequency parameter, or a channel parameter.

22. The one or more non-transitory computer-readable media of claim 14, wherein the core account comprises a checking account, a savings account, a healthcare savings account, an educational savings account, or a home equity account.

23. The one or more non-transitory computer-readable media of claim 14, further comprising automatically filling payment fields of a merchant payment page with tithe child debit card number, and (ii) the virtual PIN.

24. The one or more non-transitory computer-readable media of claim 14, further comprising, in response to receiving the user selection of the core account, offering a promotion.

25. The one or more non-transitory computer-readable media of claim 14, wherein the PIN debit child product comprises a one-time use product that is deactivated after being used once in the online payment transaction.

26. The one or more non-transitory computer-readable media of claim 14, wherein the PIN debit child product comprises a reusable product that may be used for multiple payment transactions.

27. A payment processing platform, comprising:
    a processor; and
    a memory storing instructions that, when executed by the processor, cause the processor to:
        receive, via a remote software application, a user selection of a financial institution that is separate and distinct from the payment processing platform;
        receive a user selection of a core account held with the financial institution, wherein the core account provides financial backing for a personal identification number (PIN) debit child product; and
        generate the PIN debit child product, wherein:
            the PIN debit child product is associated with the core account, the PIN debit child product includes a virtual PIN, a child debit card number, and a bank identification number (BIN), the BIN identifies the payment processing platform as an issuer of the PIN debit child product, and the PIN debit child product includes a set of control parameters, each control parameter specifying a restriction on a transaction attribute, receive, via a network, (i) the child debit card number, and (ii) a first set of transaction attributes that define an online payment transaction;

compare the first set of transaction attributes to the set of control parameters to determine whether the online payment transaction is valid;

in response to determining that the online payment transaction is valid, translate the child debit card number into a debit card number associated with the core account by using a customer ID; and transmitting, from the payment processing platform via the network to a financial institution server, the debit card number and the first set of transaction attributes, wherein the financial institution server approves the online payment transaction by processing the debit card number and the first set of transaction attributes.

* * * * *

UNITED STATES PATENT AND TRADEMARK OFFICE
CERTIFICATE OF CORRECTION

PATENT NO. : 10,755,277 B2
APPLICATION NO. : 14/326357
DATED : August 25, 2020
INVENTOR(S) : Rajesh G. Shakkarwar Page 1 of 1

It is certified that error appears in the above-identified patent and that said Letters Patent is hereby corrected as shown below:

In the Claims

Column 13, Claim 10, Line 9, please delete "tithe" and insert --(i) the--;

Column 14, Claim 23, Line 40, please delete "tithe" and insert --(i) the--.

Signed and Sealed this
Twentieth Day of October, 2020

Andrei Iancu
*Director of the United States Patent and Trademark Office*